United States Patent
Berry et al.

(10) Patent No.: US 11,315,197 B2
(45) Date of Patent: Apr. 26, 2022

(54) DYNAMIC DISPLAY OF REPRESENTATIVE PROPERTY INFORMATION WITH INTERACTIVE ACCESS TO SOURCE DATA

(71) Applicant: Fannie Mae, Washington, DC (US)

(72) Inventors: Megan C. Berry, Derwood, MD (US); Eric Rosenblatt, Rockville, MD (US); Jesse Staal, Arlington, VA (US); David A. Talbird, Bronx, NY (US); Angela Tseng, Germantown, MD (US)

(73) Assignee: Fannie Mae, Washington, DC (US)

( * ) Notice: Subject to any disclaimer, the term of this patent is extended or adjusted under 35 U.S.C. 154(b) by 1177 days.

(21) Appl. No.: 14/208,866

(22) Filed: Mar. 13, 2014

(65) Prior Publication Data

US 2015/0261791 A1 Sep. 17, 2015

(51) Int. Cl.
G06F 16/27 (2019.01)
G06Q 50/16 (2012.01)
G06Q 40/00 (2012.01)

(52) U.S. Cl.
CPC ............ *G06Q 40/12* (2013.12); *G06F 16/27* (2019.01); *G06Q 50/16* (2013.01)

(58) Field of Classification Search
None
See application file for complete search history.

(56) References Cited

U.S. PATENT DOCUMENTS

| | | | |
|---|---|---|---|
| 5,361,201 A | 11/1994 | Jost et al. | |
| 5,966,700 A | 10/1999 | Gould et al. | |
| 6,122,630 A * | 9/2000 | Strickler | G06F 16/27 |
| 7,099,843 B1 | 8/2006 | Cassidy et al. | |
| 7,289,965 B1 | 10/2007 | Bradley et al. | |
| 7,340,431 B1 | 3/2008 | McManus et al. | |
| 7,356,840 B1 * | 4/2008 | Bedell | G06F 17/30528 726/1 |
| 7,451,095 B1 | 11/2008 | Bradley et al. | |
| 7,509,261 B1 | 3/2009 | McManus et al. | |
| 7,593,890 B1 | 9/2009 | Bradley et al. | |
| 7,647,272 B1 | 1/2010 | Muren | |

(Continued)

OTHER PUBLICATIONS

Vandell, Kerry D. "Optimal Comparable Selection and Weighting in Real Property Valuation" AREUEA Journal, vol. 19, No. 2, 1991, pp. 213-239.

(Continued)

*Primary Examiner* — Yu Zhao
(74) *Attorney, Agent, or Firm* — Michael Best & Friedrich LLP

(57) ABSTRACT

A system and method may aggregate into a data structure property information from multiple databases, e.g., from all records included in those databases, and upon selection of any subject property or a characteristic thereof curates the often imperfect and discrepant property information to create suggested values. Similarly, the system and method may perform an on-the-fly evaluation of any characteristic of a selected record, when the property information for that characteristic includes an unlikely value, by triggering from the data structure a dynamic extraction of property information corresponding to a subject property of the selected record, where the dynamic extraction further generates and compares a suggested value to the unlikely value.

11 Claims, 5 Drawing Sheets

Process 500

(56) References Cited

U.S. PATENT DOCUMENTS

| | | | |
|---|---|---|---|
| 7,693,764 B1 | 4/2010 | Gordon et al. | |
| 7,711,574 B1 | 5/2010 | Bradley et al. | |
| 7,792,742 B1 | 9/2010 | Thomas et al. | |
| 7,797,166 B1 | 9/2010 | Bradley et al. | |
| 7,835,919 B1 | 11/2010 | Bradley et al. | |
| 7,882,025 B1 | 2/2011 | Seal et al. | |
| 7,904,381 B1 | 3/2011 | Tatang et al. | |
| 7,941,365 B1 | 5/2011 | Bradley et al. | |
| 7,941,366 B1 | 5/2011 | Bradley et al. | |
| 7,945,510 B1 | 5/2011 | Bradley et al. | |
| 7,974,854 B1 | 7/2011 | Bradley et al. | |
| 7,987,137 B1 | 7/2011 | Thomas et al. | |
| 7,996,304 B1 | 8/2011 | Thomas et al. | |
| 7,996,313 B1 | 8/2011 | McMurray et al. | |
| 8,010,377 B1 | 8/2011 | Bradley et al. | |
| 8,046,306 B2 | 10/2011 | Stinson | |
| 8,108,302 B1 | 1/2012 | Bradley et al. | |
| 8,140,421 B1 | 3/2012 | Humphries et al. | |
| 8,209,258 B1 | 6/2012 | Seal et al. | |
| 8,239,318 B1 | 8/2012 | Bradley et al. | |
| 8,244,563 B2 | 8/2012 | Coon et al. | |
| 8,255,320 B1 | 8/2012 | Seal et al. | |
| 8,280,806 B1 | 10/2012 | Bradley et al. | |
| 8,326,749 B1 | 12/2012 | Seal et al. | |
| 8,386,395 B1 | 2/2013 | Gordon et al. | |
| 8,401,868 B1 | 3/2013 | Bradley et al. | |
| 8,401,961 B1 | 3/2013 | McMurray et al. | |
| 8,447,688 B1 | 5/2013 | Thomas et al. | |
| 8,521,644 B1 | 8/2013 | Hanson et al. | |
| 2005/0149522 A1* | 7/2005 | Cookson, Jr. | G06F 17/30292 |
| 2005/0154656 A1 | 7/2005 | Kim et al. | |
| 2005/0154657 A1 | 7/2005 | Kim et al. | |
| 2006/0287998 A1* | 12/2006 | Foiling | G06F 17/30489 |
| 2007/0106711 A1* | 5/2007 | Buros | G06F 17/30563 |
| 2008/0004893 A1 | 1/2008 | Graboske | |
| 2012/0278243 A1* | 11/2012 | Frazier | G06Q 30/0278 705/306 |
| 2012/0303625 A1* | 11/2012 | Ciodaru | G06F 17/30566 707/740 |
| 2014/0297404 A1* | 10/2014 | Bruich | G06Q 30/0254 705/14.52 |
| 2020/0205521 A1* | 7/2020 | Dombrow | A43B 7/226 |

OTHER PUBLICATIONS

Gau, George W., et al. "Optimal Comparable Selection and Weighting in Real Property Valuation: An Extension" Journal of the American Real Estate and Urban Economics Association vol. 20, No. 1, 1992, pp. 107-123.

* cited by examiner

Interface 216a (Characteristic Display)

- 301 → Yr Built: [   ] v
- 302 → Lot Size: [   ] v
- 303 → GLA: [1200 sqft]
- 304 → Beds: [   ] v
- 305 → Baths: [   ] v
- 306 → Total Basement sq.ft.: [   ] v
- 307 → Finished Basement sq.ft.: [   ] v
- 308 → Floor: [   ] v
- 309 → # Parking Spots: [   ] v
- 310 → Condition: [   ] v
- 311 → Quality: [   ] v
- 312 → View: [   ] v
- 313 → View Description: [   ] v
- 314 → Location: [   ] v
- 315 → Location Description: [   ] v

- 316 → GIS Indicator 1: [   ] v
- 317 → GIS Indicator 2: [   ] v
- 318 → GIS Indicator 3: [   ] v
- 319 → GIS Indicator 4: [   ] v
- 320 → GIS Indicator 5: [   ] v

330 →

| Record: | Data: |
|---|---|
| Electronic Appraisal 227.0 | 1200 sq.ft. |
| Electronic Appraisal 227.1 | 1250 sq.ft. |
| *Private Record* | |
| *Private Record* | |
| Electronic Appraisal 227.i | 1200 sq.ft. |
| Tax Report 223.0 | 1200 sq.ft. |
| *Private Record* | |
| Tax Report 223.j | 1200 sq.ft. |
| *Private Record* | |
| *Private Record* | |
| MLS Document 225.k | 1200 sq.ft. |

Figure 3

Interface 216b (Record Display)

Electronic Appraisal 227.0

- 401 → Yr Built:
- 402 → Lot Size:
- 403 → GLA: 1200 sqft
- 404 → Beds:
- 405 → Baths:
- 406 → Total Basement Sqft:
- 407 → Finished Basement Sqft:
- 408 → Floor:
- 409 → # Parking Spots:
- 410 → Condition:
- 411 → Quality:
- 412 → View:
- 413 → View Description:
- 414 → Location:
- 415 → Location Description:
- 421 → Date Of Record
- 422 → Source Of Data
- 423 → Dollar Amount Of Sale
- 424 → Appraisal Number
- 425 → Adjusted Value
- 426 → Lender
- 427 → Appraiser
- 416 → GIS Indicator 1
- 417 → GIS Indicator 2
- 418 → GIS Indicator 3
- 419 → GIS Indicator 4
- 420 → GIS Indicator 5

Figure 4

DYNAMIC DISPLAY OF REPRESENTATIVE PROPERTY INFORMATION WITH INTERACTIVE ACCESS TO SOURCE DATA

BACKGROUND

Individual databases store voluminous amounts of electronic real estate records (e.g., records) that include real estate data (e.g., property information) for real properties. Users generally access the individual databases to retrieve the property information corresponding to a subject property (e.g., a real property identified by the users) in support of an evaluation of that subject property.

Unfortunately, these individual databases store a finite number of records that may be limited to a particular record type (e.g., electronic appraisals, tax records, etc.). The individual databases may further restrict the finite number of records to a real estate market, a geographic region, and/or a particular set of source data. Moreover, the property information of these records may include errors, omissions, and/or inconsistencies that are duplicated within the individual databases, and thus are undetectable.

In view of the above, the evaluations by the users based on the property information retrieved from the individual databases may be faulty. Thus, it would be desirable to provide a system and method for aggregating records corresponding to the subject property from multiple databases to support a presentation of property information to a user that is complete, unrestricted, and comprehensive.

SUMMARY OF THE INVENTION

In one example, a system and method may aggregate into a data structure property information from multiple databases, e.g., from all records included in those databases, and upon selection of any subject property or a characteristic thereof curates the often imperfect and discrepant property information to create suggested values. Similarly, the system and method may perform an on-the-fly evaluation of any characteristic of a selected record, when the property information for that characteristic includes an unlikely value, by triggering from the data structure a dynamic extraction of property information corresponding to a subject property of the selected record, where the dynamic extraction further generates and compares a suggested value to the unlikely value.

BRIEF DESCRIPTION OF THE DRAWINGS

FIG. 3 illustrates an interface generated by an automatic property information accumulation application; and FIG. 4 illustrates an interface generated by an automatic property information accumulation application.

DETAILED DESCRIPTION

A system and method provides for aggregating records from multiple databases to support a presentation, through an interface, of suggested values for characteristics of a subject property that are complete, unrestricted, and comprehensive.

For example, the system and method may aggregate into a data structure property information from multiple databases, e.g., from all records included in those databases, and upon selection of any subject property (or a characteristic thereof) curates the often imperfect and discrepant property information to create such suggested values. Similarly, the system and method may perform an on-the-fly evaluation of any characteristic of a selected record, when the property information for that characteristic includes an unlikely value, by triggering a dynamic extraction of property information from the data structure corresponding to a subject property of the selected record, where the dynamic extraction further generates and compares a suggested value to the unlikely value.

A record may be an electronically stored document that includes multiple instances of property information on a characteristic basis for at least one real property. Examples of records and/or record types may include tax records, listing service documents, electronic appraisals, etc. Records generally relate to a single property, usually referred to as a subject property; however, records may also include property information regarding other properties. For example, an electronic appraisal may include property information on a characteristic basis for a subject property and one or more comparable properties (as further described below).

Property information may be actual real estate data within a record that describes a real property, and property information may be represented as a value on a per characteristic basis. A characteristic may be a quality of a real property and, thus, may be considered a category for presenting a particular value. Examples of characteristics may include a year built characteristic, a gross living area characteristic, a number of bathrooms characteristic, etc. Continuing with the example above, the electronic appraisal may include characteristics, where each characteristic includes a related value. One of the characteristics may be, e.g., a gross living area of the subject property, and the value for that characteristic may be, e.g., 1200 sq.ft.

Thus, in an operational example, the system and method may be utilized to aggregate into a data structure property information from records from multiple databases, accumulate values on a characteristic basis for a subject property from the data structure, curate the values to output suggested values for presentation through an interface. In this way, the interface may present complete, unrestricted, and comprehensive real estate data of the subject property that would otherwise not be available.

Figure 1:
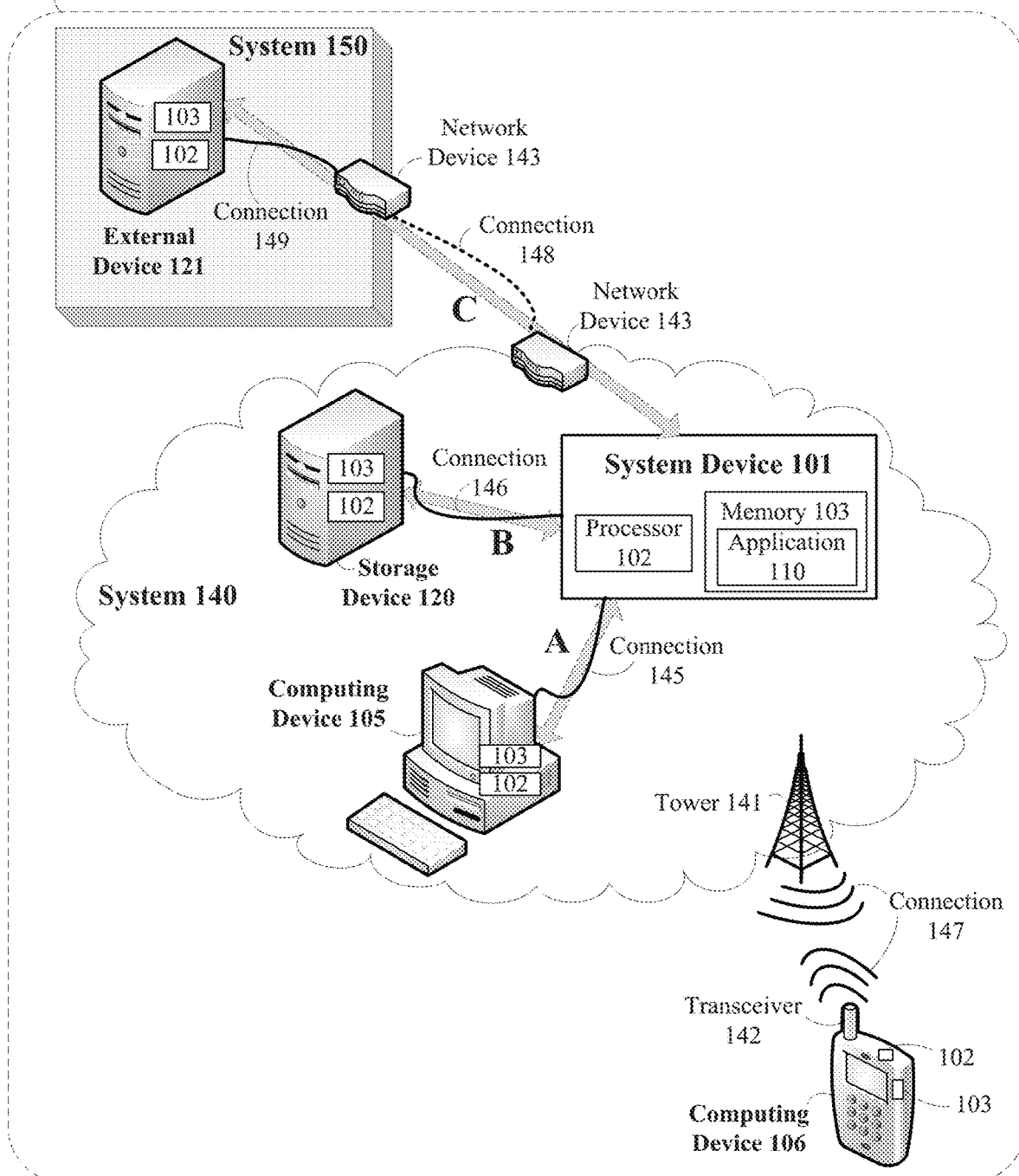
FIG. 1 illustrates an exemplary scheme in which devices operate to present property information that is complete, unrestricted, and comprehensive.

FIG. 1 illustrates an exemplary scheme 100 in which devices 101, 105, 106, 120, 121 supported by systems 140, 150 operate to present property information that is complete, unrestricted, and comprehensive. For instance, FIG. 1 illustrates a system device 101 that communicates A, B with a computing device 105 and a storage device 120 within a system 140, and that communicates C with an external device 121 of a system 150 to perform the operations of aggregating, accumulating, evaluating, curating, and presenting property information of a subject property.

For example, in response to receiving an indication that identifies a subject property from a computing device 105, the system device 101 may utilize an automatic property information accumulation application 110 (application 110) stored on a memory 103 to aggregate records related to subject property from the storage device 120 and the external device 121 (e.g., via communication B, C). The application 110 may in turn generate a first data structure to hold property information from the records, a plurality of second data structures on a characteristic basis, and a value for each second data structure. Next, the application 110 may generate an interface that presents a set of selectable fields, each selectable field corresponding to one of the second data structures and presenting a corresponding value to that second data structure. The interface is communicated A to the computing device 105 by the system device 101 so that a complete, unrestricted, and comprehensive presentation of the subject property may be displayed by the computing device 105.

The items of the exemplary scheme 100 will now be further described with reference to FIG. 1, as FIG. 1 illustrates exemplary infrastructure components that support the communication operations (e.g., communications A, B, C) between the devices 101, 105, 106, 120, 121 and systems 140, 150. The exemplary infrastructure components may include a tower 141, a transceiver 142, a network device 143, and connections 145-149. FIG. 1 also includes alternative representations for the computing devices 105, 106, to illustrate different exemplary configurations of the exemplary scheme 100, which are further described below.

The exemplary scheme 100, devices 101, 105, 106, 120, 121, and systems 140, 150 may be any computing system and/or device that includes a processor and a memory (e.g. 102 and 103, respectively). Computing systems and/or devices generally include computer-executable instructions, where the instructions may be executable by one or more computing devices such as those listed below. Computer-executable instructions may be compiled or interpreted from computer programs created using a variety of programming languages and/or technologies, including, without limitation, and either alone or in combination, Java™, C, C++, Visual Basic, JavaScript, Perl, etc. The exemplary scheme 100 and items therein (e.g., the devices 101, 105, 106, 120, 121, and the systems 140, 150) may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., the exemplary scheme 100, the devices 101, 105, 106, 120, 121, and the systems 140, 150) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, cell phones, smart-phones (e.g., the computing device 106), super-phones, tablet computers, next generation portable devices, mobile printers, handheld computers, secure voice communication equipment, or some other computing system and/or device. Alternatively, computing systems and/or devices may also be a computer workstation, a server (e.g., system device 101), a desktop (e.g., the computing device 105), a notebook, or a laptop.

Further, the processor or the microprocessor (e.g., processors 102) of computing systems and/or devices receives instructions from the memory (e.g., memories 103) and executes these instructions, thereby performing one or more processes, including one or more of the processes described herein (e.g., the operations of aggregating, accumulating, evaluating, curating, and presenting property information of a subject property). Such instructions and other data may be stored and transmitted using a variety of computer-readable mediums (e.g., memory 103).

A processor 102 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 102 may be any one of, but not limited to single, dual, triple, or quad core processors (on one single chip), graphics processing units, visual processing units, and virtual processors.

A memory 103 may be, in general, any computer-readable medium (also referred to as a processor-readable medium) that may include any non-transitory (e.g., tangible) medium that participates in providing data (e.g., instructions) that may be read by a computer (e.g., by processors 102 of the devices 101, 105, 106, 120, 121). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, the elements of the devices 101, 105, 106, 120, 121 may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the operations described herein.

The system device 101 and computing devices 105, 106 may generally be any electronic hardware that includes a processor 102 and a memory 103 and is capable of receiving and processing inputs (e.g., user entered data that provides indications of a selection of a field or instance of a user interface as described below) and sending/receiving electronic data transfers (e.g., communications A, B, C) to and from the systems 140, 150 that include those inputs.

The system device 101 and computing devices 105, 106 may further, include a display, support interfaces, and/or communicate within the exemplary scheme 100. A display is an output device for presentation of information in visual or tactile form, such as interfaces or web portals. Examples of display may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like. Thus, a display of any device 101, 105, 106 may generate and/or present interfaces or a web portal to a user, such that the user may interact with and receive information from other computing devices 105, 106 or the system device 101.

The system device 101 and computing devices 105, 106 may further utilize the processor 102 to operate an automatic property information accumulation application 110 (e.g., application 110 of FIG. 2 described below) to perform the operations of aggregating, accumulating, evaluating, curating, and presenting property information of a subject property.

For example, the system device 101 may also be any hardware that includes a processor 102 and a memory 103 and automatically aggregates into a data structure property information from records from multiple databases (e.g., internal memory 103, storage device 120, and/or external device 121), accumulate values on a characteristic basis for a subject property from the data structure, curate the values to output suggested values, and generate an interface to present the suggested values. Further, the system device 101 may be a server.

In general, a server may be any computing system and/or device (as described above) acting as databases, data repositories or other data stores that includes any type of data structure, source, and/or file system that manages and records electronic real estate records, property information, electronic data transfers, etc.

One example of a data structure is a stack, or a data type that holds imported data (e.g., data pushed onto the stack) and that deletes exported data (e.g., data popped off the stack). A stack may be a comprehensive stack that holds property information from all the records aggregated from all the available databases. Thus, when 20 different records are acquired and parsed for property information, the parsed property information is pushed onto the comprehensive stack. And, as the property information is popped off the stack, the property information may be sorted into additional data-structures.

An example of an additional data structure is a sub-stack that corresponds to a characteristic and that holds the property information popped from the comprehensive stack that matches the corresponding characteristic. Therefore, as the comprehensive stack pops property information, that property information may be pushed onto a corresponding sub-stack based on the characteristic. Examples of sub-stacks may include a year built sub-stack that holds year built property information, a gross living area sub-stack that holds gross living area property information, a number of bathrooms sub-stack that holds bathroom number property information.

After the property information is pushed onto a sub-stack, a heuristic may also be utilized to curate that property information to produce a suggested value or, e.g., collapsed result for that sub-stack (as further described below).

Note that while the above stacks, values, and results may be utilized in the following description, this nomenclature and/or particular data structure is not intended to be limiting. Indeed, additional or alternative data structures and/or nomenclatures may be used.

The server may also include a data management client, along with licenses (e.g., a license that permits control and access of an automatic property information accumulation application 110 by the computing devices 105, 106) relating to data management access and/or configurations. Thus, a device management client may include executable instructions that manage the communications (e.g., communication A, B, C) with computing devices 105, 106 by setting configurations and diagnostics based on a particular protocol.

Further, databases, data repositories or other data stores (e.g., storage device 120, external device 121, and/or database 220 of FIG. 2 described below) described herein may generally include various kinds of mechanisms, including a hierarchical database, a set of files in a file system, an application database in a proprietary format, a relational database management system (RDBMS), etc., for storing, providing, accessing, and retrieving various kinds of data. Data may include the records and the property information contained therein. The records may further be identified by an identifier, such as a physical address of the subject property, identification number, and/or other information unique to the record.

Each such data store may also generally be included within or external to a computing system and/or device (e.g., the devices 101, 105, 106, 120, 121) employing a computer operating system such as one of those mentioned above, and/or accessed via a network (e.g., systems 140, 150) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above. Thus, the storage device 120, external device 121, and/or database 220 of FIG. 2 may, for example, include at least one of a tax databases, public sale record databases, loan acquisition databases, real estate owned (REO) databases, property appraisal databases, etc.

Systems 140, 150 may be a network that provides the infrastructure through which the devices 101, 105, 106, 120, 121 communicate. In general, a network (e.g., system 140, 150) may be a collection of computers and other hardware to provide infrastructure to establish virtual connections and carry communications. For instance, a network may be an infrastructure that generally includes edge, distribution, and core devices (e.g., tower 141 or network device 143) and enables a path (e.g., connections 145-149) for the exchange of information between different devices and systems (e.g., between the devices 101, 105, 106, 120, 121 of the exemplary scheme 100). Further, a network may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications. The systems 140, 150 are representative, and thus while a single cloud illustrates the system 140 and a single block illustrates the system 150, these illustrations may represent a single network, a combination of different networks components and technologies, and/or a plurality of networks, as described above.

The tower 141 may be a tall structure designed to support antennas or aerials for telecommunications amongst the exemplary scheme 100. The tower 141 may enable the connection 147 that carries signals to or from the system 140 and the transceiver 142 of the computing device 106.

The transceiver 142 may be any connector used for digital or analog signal transfers. For instance, the transceiver 142 may be any antenna technology, such as cellular, Wi-Fi, or the like, that implements a wireless exchange of data by converting propagating electromagnetic waves to and from conducted electrical signals. Further, the transceiver 142 may be an antenna technology that implements Wi-Fi, near field communication, Bluetooth®, or the like, which is used to exchange data wirelessly using radio waves over a shortwave radio range or network that enables direct communication.

Network devices 143 may be a computing system and/or device, as described above, that are gateways between connections of the exemplary scheme 100. For instance, a communication path between the system device 101 and external device 121 is completed by the network devices 143 and the connections 148-149.

The connections 145-149 may be wired or wireless connections between two endpoints (devices or systems) that carry electrical signals that facilitate virtual connections. Examples of connections 145-149 may be any transmission media including radio waves, metal wire, fiber optics, and the like. Virtual connections are comprised of the protocol infrastructure that enables communication (e.g., communications A, B, C) to and from the devices 101, 105, 106, 120, 121. Thus, the connection 145 may be a wired connection between the system device 101 and the computing device 105 within the system 140; the connection 146 may be a wired connection between the system device 101 and the storage device 120 within the system 140; the connection 147 may be a wireless connection between the tower 141 and the transceiver 142; the connection 148 may be a wired connection between the network device 143 of system 140 and the network device 143 of system 150; and the connection 149 may be a wired connection between the network device 143 and the external storage device 121 within system 150. Further, the combination of connections 145-149 support the virtual connections of the exemplary scheme 100, and therefore, any device 101, 105, 106, 120, 121 may communicate with another device 101, 105, 106, 120, 121 based on a need of the exemplary scheme 100.

Figure 2:
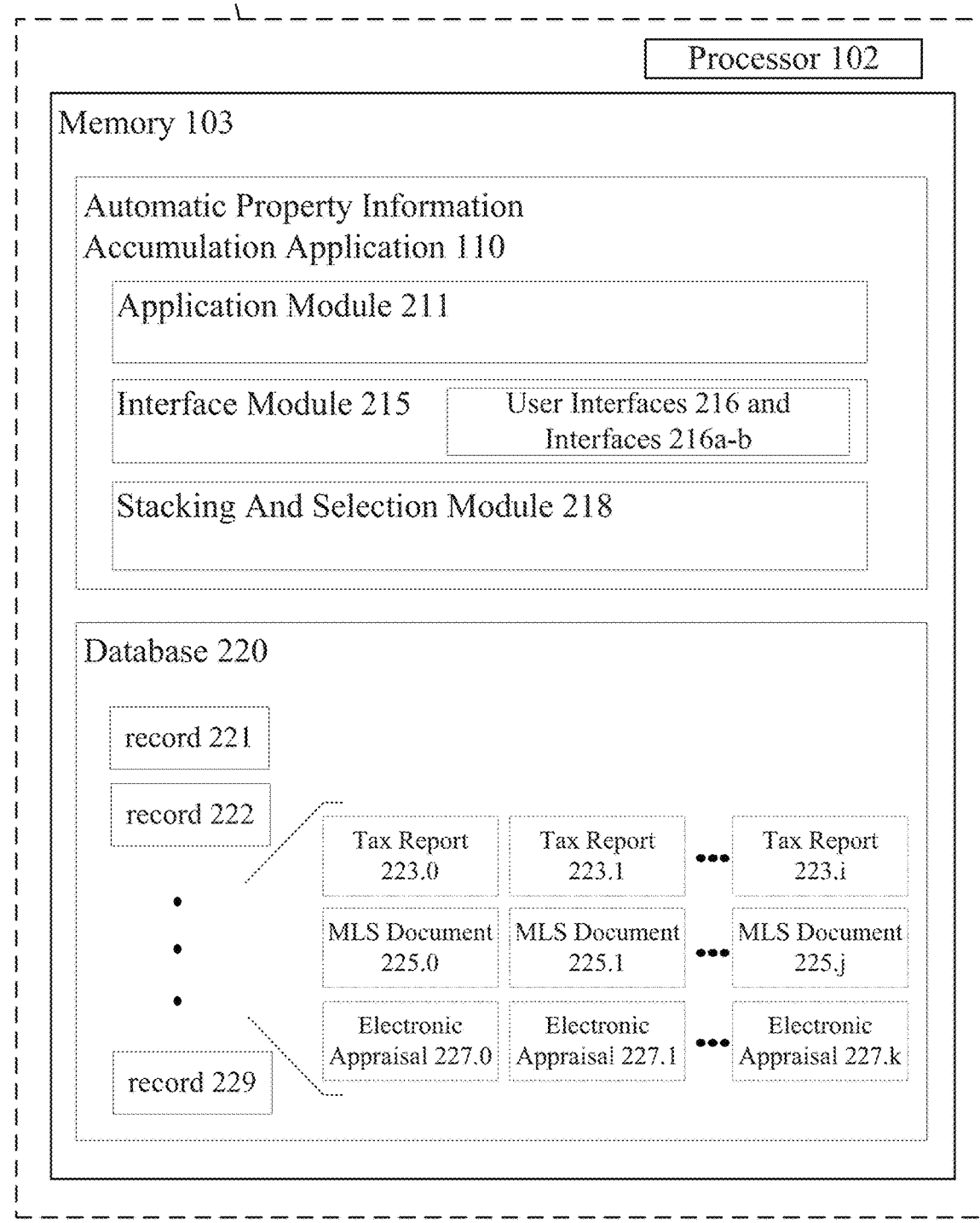
FIG. 2 illustrates an exemplary schematic of an automatic property information accumulation application.

FIG. 2 illustrates an automatic property information accumulation application 110 (application 110) and a database 220 stored on a memory 130 of any of the devices 101,120 (as illustrated by the dashed-box).

The application 110 is configured to process property information of any record corresponding to a real property on a characteristic basis using data structures. The application 110 includes an application module 211, an interface module 215 that generates user interfaces 216 (e.g., interfaces 216a-b), and a stacking and selection module 218.

Although one modular breakdown of the application 110 (and database 220) is offered, it should be understood that the same functionality may be provided using fewer, greater, or differently named modules. Further, although it is not shown, the interface module 215 and the application module 218 may be integrated with any of the above named modules.

In one schematic example, a single computing device, such as the system device 101, may be independently configured to include the entire operability of the application 110, as illustrated in FIG. 2. Thus, the application 110 may generally be operated independently by one of the devices 101, 105, 106. For instance, based on an input that identifies a subject property received via a user interface 216 of the interface module 215, the application 110 may utilize the application module 211 and stacking and selection module 218 to aggregate property information from records 221-229 of the database 220 into a comprehensive stack, accumulate or sort values into sub-stacks on a characteristic basis for the identified subject property from the comprehensive stack, and curate the values on a sub-stack basis to output a collapsed result for that sub-stack. Next, the application 110 may utilize the interface module 215 and stacking and selection module 218 to generate an interface 216a that presents a set of selectable fields, each selectable field corresponding to one of the sub-stacks and presenting the suggested value corresponding to that sub-stack so that a complete, unrestricted, and comprehensive presentation of the subject property may be displayed by the system device 101.

As an alternative schematic example, the operability of the application 110 may be divided between the devices 101, 105, 106, 120, 121 where modules 211, 215, 218 may be located separately or duplicated on different devices 101, 120 and accessed through connections 145-149 via distributed computing, such that the operability is provided for, shared, and relied upon by other devices 101, 105, 106, 120, 121. Thus, the application 110 may generally be divided between the devices 101, 105, 120, 121 where modules 211, 215, 218 may be duplicated on different devices and accessed through connections 145,146, 148-149. For example, the application 110 of the computing device 105 may utilize a user interface 216 to receive an input or indication (from a user who desires to review a subject property) that includes a physical address of the subject property. The system device 101 and the computing device 105 may communicate A via their respective applications 110 to transfer the indication. The applications 110 of the system device 101 may utilize the indication to aggregate into a comprehensive stack property information from records 221-229 associated with the subject property from multiple databases, such as from the database 220 of the internal memory 103 and/or via communicating (e.g., communication B, C) with the storage device 120 and the external device 121. Based on the aggregated records 221-229, the application 110 of the system device 101 may accumulate values into sub-stacks on a characteristic basis for the identified subject property from the comprehensive stack, and curate the values on a sub-stack basis to output a collapsed result for that sub-stack. Further, the system device 101 and the computing device 105 may again communicate A via their respective applications 110 to transfer the comprehensive stack, the sub-stacks, values, and the collapsed results, which the application 110 of the computing device 105 in turn utilizes to generate an interface 216a that presents the subject property along with the collapsed results and underlying values in a complete, unrestricted, and comprehensive manner.

The items of the exemplary schematic 100 of the automatic property information accumulation application 110 will now be further described with references to FIG. 2.

The application module 211 may include a set of executable instructions configured to facilitate communication between the modules of the application 110 and hardware/software components external to the application 110, including the devices 101, 105, 106, 120, 121. That is, the application module 211 may be configured to communicate directly with other applications, modules, models, devices, systems, and other sources through both physical and virtual interfaces. Further, the application module 211 may include executable instructions and specifications for routines, data structures, object classes, and variables that receive, package, present, and transfer data through connections 145-149 or through systems 140, 150. For example, the application module 211 may be configured to receive inputs from the interface module 215 or sources external to the system device 101 and forward the inputs to the stacking and selection module 218 for processing.

The application module 211 may also manage the dispatching and receipt of data/information along with integrating the application 110 with other applications and drivers, as needed per operating system. A driver may be a computer routine that controls a particular physical component of device or a peripheral (e.g., a printer, display, or the like) attached to the device. Thus, the application module 211 may manage and translate input/output requests into data processing instructions for the central processing unit (e.g., processor 102) and may include a set of executable instructions that itemizes and implements the data structures, object classes, and variables that interact with the drivers to operate physical components and that launch routines and/or programs (e.g., send and receive instructions/data/information to and from the system device 101, the computing devices 105, 106, the storage device 120, and/or external device 121).

The interface module 215 may include a set of executable instructions for generating and managing user interfaces 216, which receive inputs and present information. The inputs received by the user interfaces 216 may generally be communicated by interface module 215 to the application module 211, which in turn forwards the inputs to the stacking and selection module 218 for processing.

The interface module 215 may also commandeer or utilize interface formatting local to the device in which the application 110 is stored thereon (e.g., appropriating interfaces of the devices 101, 105, 106). The interface module 215 may also provide remote interface formatting for a device in which only a portion of the application 110 is stored thereon (e.g., providing web portal interfaces for computing devices 105, 106 through which the system device 101 may provide information and receive inputs). The interface module 215 may thus generate or utilize local, terminal, web-based, and mobile interfaces and any similar interface that presents and receives information relative to the devices 101, 105, 106.

The user interfaces 216 may include any presentation of information or data, such as property information or collapsed results, through a display (as described above), whether graphic or otherwise, where interaction between a user and the application 110 occurs. The user interfaces 216 may receive inputs indicating user selections and/or user instructions, along with indicating a subject property for aggregating and curating the property information presented by the user interfaces 216 and along with indicating a selectable field for generating subsequent user interfaces 216.

The user interfaces 216 may also include any presentation of information or data through fields, banners, icons, badges, alerts, sounds, text, or any combinations thereof. A field may be a reserved space of an interface that presents alphanumeric text and/or menu items identifying property information of a subject property and may also be a mechanism for receiving input that causes the application 110 to perform additional operations. A banner may be a media or drop-down menu that extends from a top portion of an interface, a sub-interface, and/or display and that may include text, badges, and animated symbols. An icon and/or a badge may be a number or symbol that signals a link, an event, or a number of events. An alert may be a pop-up window that may be oriented within the display (e.g., centered) and that may include text, badges, and animated symbols.

Thus, the interface module 215 may generate new and unique user interfaces 216 particular to the application 110. For instance, the interface module 215 may generate a Characteristic Display interface (e.g., interface 216*a*) that presents property information relative to a subject property through a set of selectable fields and/or a Record Display interface (e.g., interface 216*b*) that presents property information of a selected record.

A selectable field may correspond to a sub-stack generated from the comprehensive stack for the subject property and present a collapsed result for that sub-stack, such that the Characteristic Display interface presents the collapsed result as the property information of a particular characteristic of the subject property (e.g., present the data so that a user, by clicking a field, may review all of the data values available for a particular field). As indicated above, a collapsed result may be a result of a heuristic that curated the values of any sub-stack, and therefore the collapsed result may be a representative value for a characteristic of the subject property. Thus, since real properties generally include more than one characteristic, which the associated records may in turn reflect, the Characteristic Display interface may include a plurality or set of selectable fields that draw on multiple sub-stacks and present multiple corresponding collapsed results (Note that aggregating, accumulating, and curating property information across a plurality of records to generate stacks and results will be further described below with reference to the stacking and selection module 218).

FIG. 3 illustrates an example of an interface 216*a* generated by the interface module 215 of the automatic property information accumulation application 110. The user interface 216*a* may be referred to as a 'Characteristic Display' interface that presents property information relative to a subject property through a set of twenty selectable fields 301-320, each selectable field corresponding to one of the sub-stacks curated by the stacking and selection module 218 and presenting a corresponding collapsed result to that sub-stack.

The selectable fields 301-320 of FIG. 3 include a year the subject property was built ('Yr Built' 301); a lot size of the subject property ('Lot Size' 302); a gross living area (GLA) of the subject property ('GLA' 303); a number of bedrooms in the subject property ('Beds' 304); a number of bathrooms in the subject property ('Bath' 305); a total square footage of a basement of the subject property ('Total Basement sq.ft.' 306); a finished square footage of the basement of the subject property ('Finished Basement sq.ft.' 307); a floor location of the subject property ('Floor' 308), which generally only applies to condominiums; a number of parking spots related to the subject property ('# Parking Spots' 309); a condition of the subject property ('Condition' 310); a quality of the subject property ('Quality' 311); a view from the subject property ('View' 312); a description of the view from the subject property ('View Description' 313); an indication of the location of the subject property ('Location' 314); a description of the location of the subject property ('Location Description' 315); and a geographic information system (GIS) indicator for the subject property ('GIS Indicator 1' 316 through 'GIS Indicator 5' 320). Examples of GIS indicators may include a GIS near golf course indicator, a GIS near railroad indicator, a GIS near ocean indicator, a GIS road indicator, a GIS inland water indicator, etc.

Further, the selectable fields 301-320 may be a mechanism for receiving input (e.g., user selection or identification of a field) that triggers additional operations by the application 110, such as causing the interface module 215 to generate a sub-interface. A sub-interface presents instances of the underlying property information or values of the sub-stack corresponding to the identified field on a per record basis, where each instance is further selectable through the sub-interface. For example, in response to an input identifying 'GLA' 303, the interface module 215 may generate a sub-interface 330 that includes eleven instances of property information accumulated from eleven records. Each instance of property information is selectable, and upon selection may cause the application 110 to generate the Record Display interface.

FIG. 4 illustrates an example of an interface 216b generated by the interface module 215 of the automatic property information accumulation application 110. This interface 216b may be generated by the interface module 215 in response to the selection of an instance of property information from the set of instances of the sub-interface 330 (e.g., when the electronic appraisal 227.0 instance is selected from the sub-interface 430). Thus, the interface 216b may be referred to as a 'Record Display' interface that presents property information of the electronic appraisal 227.0. As illustrated, the 'Record Display' interface includes data fields 401-427, of which data fields 401-420 correspond to the same characteristics that correspond to the set of twenty selectable fields 301-320. Further, while the data fields 421-427 correspond to characteristics that are particular to the electronic appraisal 227.0, the data fields of the 'Record Display' interface may vary according to the underlying record. The data fields 421-427 of FIG. 4 include a date when the electronic appraisal 227.0 was created ('Date Of Record' 421); a database from which the electronic appraisal 227.0 was retrieved ('Source Of Data' 422); a sale price for the subject property of electronic appraisal 227.0 ('Dollar Amount Of Sale' 423); an identification number for the electronic appraisal 227.0 ('Appraisal Number' 424); an adjusted sale price estimation for the subject property of the electronic appraisal 227.0 ('Adjusted Value' 425); a name of the mortgage company that issued the mortgage for the sale of the subject property of the electronic appraisal 227.0 ('Lender' 426); and a name or identification number of the appraiser who created the electronic appraisal 227.0 ('Appraiser' 427).

Thus, the interface module 215, user interfaces 216, and interfaces 216a-b of the application 110 may enable the presentation of property information, such as suggested values and underlying values, for a characteristic to assist in user evaluation of any subject property.

The stacking and selection module 218 may include a set of executable instructions configured to aggregate, accumulate, curate, and present—along with evaluate and refine— property information of a subject property.

The stacking and selection module 218 may, in conjunction with the application module 211, scan databases (e.g., multiple real estate data sources) to aggregate all of the records and/or property information of those records into a first data structure (e.g., a comprehensive stack) or to collect the property information of those records on characteristic bases. That is, in general, the stacking and selection module 218 may present a user with the most up to date information because it includes all records in an analysis from the moment the analysis begins. The stacking and selection module 218 may further dynamically update the analysis to include records when new records are added to the databases or comprehensive stack. For example, if at 10:00 am the comprehensive stack contains a million records, and at 10:01 am another 10,000 records are added, at 10:02 am, when a single characteristic is selected for analysis, the additional 10,000 records are included in the comprehensive stack for analysis.

The stacking and selection module 218 may accumulate or sort the property information of the first data structure into second data structures (e.g., sub-stacks) that correspond to characteristics of the subject property. The stacking and selection module 218 may then generate a value for each second data structure based on the property information of that second data structure. For example, after the stacking and selection module 218 scans the databases to aggregate property information of all of the records into a comprehensive stack, the stacking and selection module 218 may generate a set of sub-stacks and may accumulate values for each characteristic of the identified subject property from the comprehensive stack into the corresponding sub-stack. An example of sub-stack may be a gross living area (GLA) sub-stack that holds the GLA values popped from the comprehensive stack—see Table 1 GLA Sub-Stack. In Table 1 GLA Sub-Stack, the GLA sub-stack includes 11 instances of values pertaining to the identified subject property, where each instance corresponds to a record.

TABLE 1

GLA Sub-Stack:

| Instance | Source | Value for GLA |
| --- | --- | --- |
| 1 | Appraisal 01 | 1200 sq. ft. |
| 2 | Appraisal 02 | 1250 sq. ft. |
| 3 | Appraisal 03 | 1200 sq. ft. |
| 4 | Appraisal 04 | 1300 sq. ft. |
| 5 | Appraisal 05 | 1200 sq. ft. |
| 6 | Tax Record 01 | 1200 sq. ft. |
| 7 | Tax Record 02 | 1300 sq. ft. |
| 8 | Tax Record 03 | 1200 sq. ft. |
| 9 | MLS 01 | 1200 sq. ft. |
| 10 | MLS 02 | 1250 sq. ft. |
| 11 | MLS 03 | 1200 sq. ft. |

The stacking and selection module 218 curates the values of any sub-stack, such as by utilizing a heuristic. For instance, when there are data errors, omissions, and/or inconsistencies between records, the stacking and selection module 218 may then overcome data irregularity by applying a heuristic that compares the property information within the sub-stack and generates a suggested value for that characteristic. The heuristic of the stacking and selection module 218 may be a stacking and collapsing heuristic that is utilized to identify the most likely value or descriptor (e.g., suggested value) for a characteristic of a subject property from sub-stack. An example a stacking and collapsing heuristic may be a set of mathematical calculations to estimate, locate, and/or display a collapsed value (e.g., the mean, the median, the mode, the most recent values for real property descriptors, etc.). For example, the stacking and collapsing heuristic may select the most recent of the values for TABLE 1 GLA Sub-Stack, which may be 1300 sq.ft, because the newest record may be the most reliable. As another example, the stacking and collapsing heuristic may calculate the median of the values for TABLE 1 GLA Sub-Stack, which is 1200 sq.ft. Next the stacking and selection module 218 may utilize 1200 sq.ft. as a collapsed result for the interfaces 216a-b. Thus, despite the inconsistency across the 11 instances of values in the GLA sub-stack, the stacking and selection module 218 provides a collapsed result. Note that the heuristic of the stacking and selection module 218 may also be utilized to evaluate property information from sub-stack from the comprehensive stack, another data structure, and/or any unique dataset. In addition, the stacking and selection module 218 may utilize the heuristic to complete omitted or missing data of existing records by filling in empty data fields with a corresponding suggested value.

The stacking and selection module 218 generates and outputs collapsed values for presentation through a user interface. For example, the stacking and selection module 218 may receive an indication through a user interface 216 that identifies a record. In turn the stacking and selection module 218 will aggregate, accumulate and curate property information for a subject property of the record. Once curated, the stacking and selection module 218 will output a set of collapsed values, each of which may be presented by the interfaces 216a-b, such as the 'Characteristic Display' interface of FIG. 3, for user review.

In support of aggregating, accumulating, curating, and presenting, the stacking and selection module 218 may further receive indications through the interface that identify a selectable field. In an operational example, the stacking and selection module 218 may receive an indication (e.g., receive inputs from the interface module 215 through the application module 211 and/or from the interface module 215 through the application module 211) that selects a subject property; acquire the plurality of records associated with the identified subject property; aggregate or extract property information from the a plurality of records associated with the identified subject property; accumulate the property information in sub-stacks or groups corresponding to characteristics of the identified subject property; and curate the property information in each group to generate a collapse value for that particular group.

The stacking and selection module 218 may further evaluate and/or refine property information for presentation. That is, stacking and selection module 218 may evaluate and/or refine property information for presentation by utilizing a time range, which may be respective to a date of a record, to exclude property information from the comprehensive stack and/or sub-stacks (e.g., filtering may remove records that are irrelevant to the analysis due to age). For instance, if 11 instances of a GLA sub-stack are distributed over a time period of 50 years, the stacking and selection module 218 may utilize a value that is less than 50, such as 25 years, to filter instances outside of the 25 years. Further, the stacking and selection module 218 may bookend property information in a window of time based on the date in the selected record. For example, if 30 instances of a GLA sub-stack are distributed over a time period of the past 100 years, the stacking and selection module 218 may utilize a date of a most recent record and a value that is less than 100, such as 10 years, to filter instances older than the most recent 10 years of records.

The stacking and selection module 218 may also evaluate and/or refine property information for presentation by selecting and/or identifying characteristics for evaluation by a user. For instance, property information may be filtered based upon an algorithmic analysis of appraiser-entered data, such that appraisers who enter property information inconsistently may have their records filtered from value consideration. Further, the records for appraisers with property information that appears self-consistent receive greater weight during value consideration. Thus, property information filtering may result in the display of most likely suggested values for any characteristic.

The stacking and selection module 218 may also evaluate and/or refine property information for presentation by providing evaluation filtering based on privileges to view property information, such as according to user credentials filter records. Certain users may view all records in the comprehensive data stack, while other users may only view tax record property information and/or records based upon a set of appraisals filtered by their user identification number. For the latter, the stacking and selection module 218 may provide access to all records from all users for a particular appraiser, as long as that appraiser's work is relevant to the targeted user.

Further, privileges may be implemented via privacy filters that hide particular data. Privacy filters may be related to who has a right to the view property information, e.g., when a first party does not have access to a second party's information (such as sharing a first bank's information with a second bank). As illustrated in FIG. 3, the interface module 215 may generate a sub-interface 330 that includes eleven instances of property information accumulated from eleven records. However, while five of these instances are hidden as a 'Private Record' because the current user does not have the right to view those instances, the collapsed value may still be calculated from each of the eleven instances. Another mechanism for implementing a privacy filter may be when a portion of the property information of the instance is viewable (e.g., the property information is presented while the bank name is hidden).

The stacking and selection module 218 may also derive, on-the-fly, a most-likely value (e.g., suggested or collapsed result) for any property characteristic selected or otherwise identified. For example, after presenting a reviewer with the most likely collapsed results, the stacking and selection module 218 may allow the reviewer during their review of the property information to confirm that the collapsed values are the best or most likely value for any particular characteristic. Also, for example, after presenting a reviewer with a selected record, the stacking and selection module 218 may perform an on-the-fly evaluation of any characteristic of the selected record. In operation, if the property information for any characteristic seems unlikely to the reviewer, the reviewer may through the selection of the field corresponding to that unlikely value trigger a dynamic extraction of property information from all available databases corresponding to a subject property of the selected record. The dynamic extraction in turn generates a suggested value for the characteristic based on the extracted property information and presents the suggested value alongside the unlikely value for further review.

Further, a sub-stack for a particular characteristic may be created dynamically (e.g., on-the-fly) when a selectable field corresponding to that characteristic is selected. Thus, the stacking and selection module 218 may also provision for data source analysis. In operation, when a reviewer accesses a collapsed result via a selectable field, the application 110 may display the source values it used in a second UI grid (e.g., as illustrated in sub-interface 330). When a reviewer selects another selectable field the collapsed result of another characteristic, the stacking and selection module 218 may dynamically extract the property information required from the comprehensive stack and creates a new sub-stack for the single corresponding characteristic on-the-fly. The characteristic dataset may further be windowed around a date of a record for the chosen selectable field, and in turn irrelevant property information may be excluded from analysis. For example, if the presented GLA value for a particular subject property was sourced from an appraisal dated in 2010, the stacking and selection module 218 may filter in the GLA sub-stack to include only records from 2005 to the present.

Thus, in operation, the application 110 may, for example, aggregate records corresponding to a real property from all databases (as described below) available to the application 110. The application 110 may generate a first data structure for the real property to hold property information from the aggregated records. The application 110 may next generate a plurality of second data structures, each of which corresponds to a property characteristic of the real property and each of which is configured to hold the property information of the first data structure that matches the property characteristic corresponding to that second data structure. Further, the application 110 may receive an indication that identifies the real property as a subject property and may generate an interface that presents a set of selectable fields, each selectable field corresponding to a second data structure of the plurality and presenting a value corresponding to that second data structure. The application 110 may, upon receipt of another indication that identifies any of the selectable fields, also generate a sub-interface that presents instances of property information held by the second data structure corresponding to that selectable filed. The instances may be presented by application 110 on a per record basis and may be further selectable through the sub-interface, where the interface and/or the sub-interface may be user interfaces that receive indications (e.g., user inputs) that identify the selectable fields or instances of that interface.

The database 220 may be representative of multiple sources for multiple markets that includes real estate data (e.g., property information). Thus, the database 220 may store and manage records 221-229 of the multiple sources, examples of which include tax records 223.0-223.$i$, multiple listing service (MLS) documents 225.0-225.$j$, and electronic appraisals 227.0-227.$i$. The notations of 'i,' 'j,' and 'k' indicate a plurality of records for a category stored on the database 220. While the records 221-229 are exemplary, the database 220 may have different types and/or amounts of property records than illustrated. In general, each record 221-229 may include property information on a characteristic basis that collectively may provide multiple instances of property information for a subject property (e.g., a first record may provide 1200 sq.ft for a gross living area of a subject property, while a second record may provide 1250 sq.ft. for that same characteristic of the same property).

Thus, the system device 101 (and alternatively the devices 105, 106, 120, 121), as described above, may include various kinds of mechanisms for storing, providing, accessing, and retrieving various kinds of records 221-229 from a database 220, such as electronic tax records 223, MLS documents 225, and electronic appraisals 222.

Tax records 223, MLS documents 225, and electronic appraisals 222 are different record types that digitally relate to real properties. For example, electronic appraisals 227 may that represent the uniform residential appraisal report form and include multiple sections with multiple data fields, each of which may memorialize characteristics that contribute to the valuation of the subject property. Tax records 223, MLS documents 225, and electronic appraisals 222 may also include user data, which may be held by the application 110. User data may include identification information of the individual creating the records 221-229, inputting property information, etc. The user data may also be stored and based on privileges (e.g., licenses, security right, etc.) enable different users to access and review the information that is associated with the user data.

Figure 5:
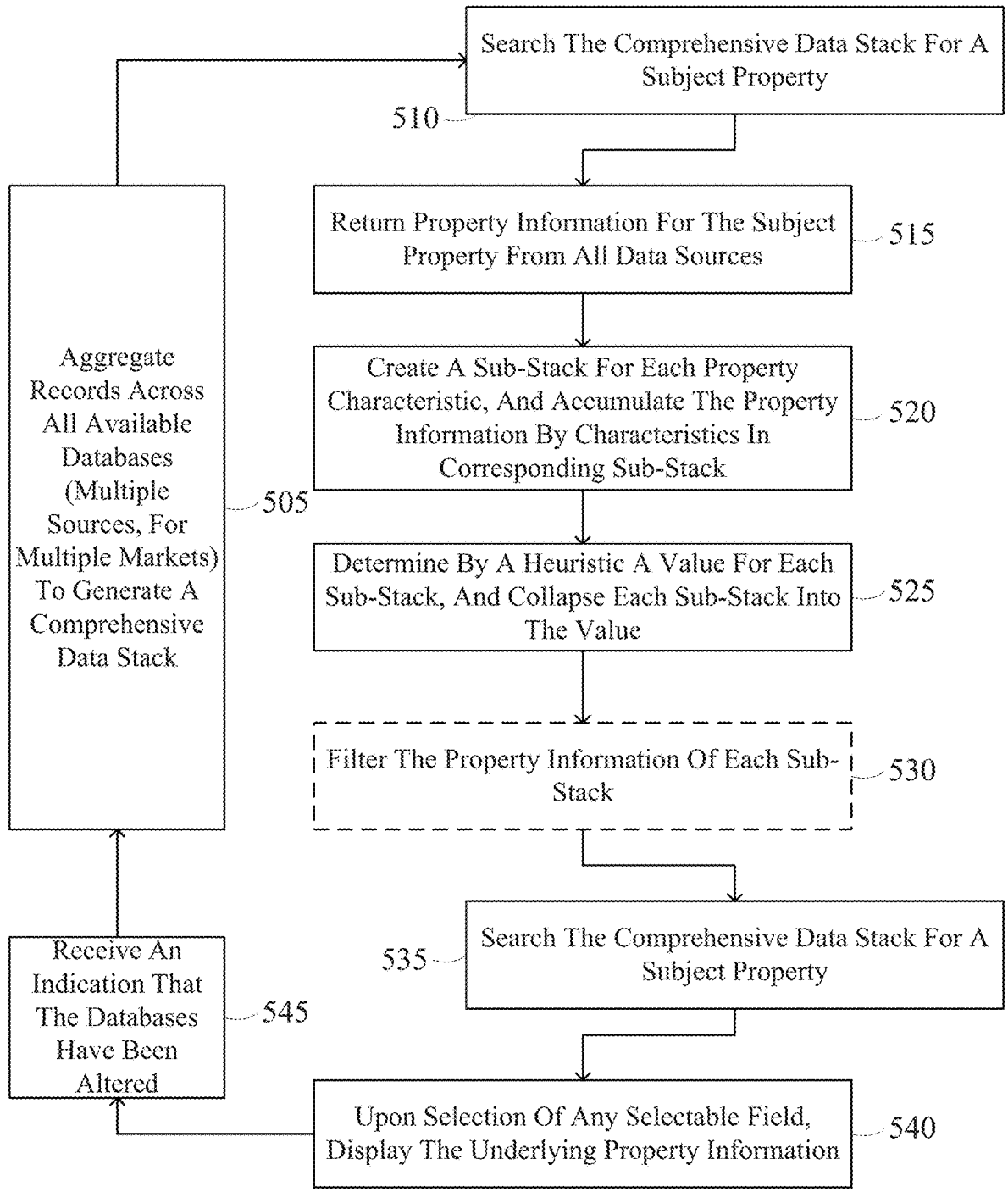
FIG. 5 illustrates an exemplary process flow of an operation of an automatic property information accumulation application.

FIG. 5 illustrates an exemplary process flow 500 of an operation of an automatic property information accumulation application 110. The exemplary process flow 500 begins by the application 110 aggregating records 505 across all available databases 220 to generate a comprehensive data stack. For instance, the application 110 may access databases both local and/or remote to the application 110 and collect property information of those records into the comprehensive stack.

Next, the application 110 searches 510 for a particular target property (e.g., subject property) from the comprehensive data stack by locating property information for the subject property within the comprehensive stack. The application 110 then returns 515 the property information for the subject property, which were aggregated from all available data sources by the comprehensive stack, for sorting into groups. For instance, the application creates 520 a sub-stack for each property characteristic so that the property information returned for the subject property may be held by each sub-stack on a characteristics basis.

With the property information for the subject now accumulated or sorted into groups, a most likely value (e.g., collapsed value) for each group may be determined 525 by a heuristic of the application 110. The most likely value represents the group, while the property information is collapsed behind that value (e.g., logically stored so that the property information may be later presented to the user via a sub-interface). Optionally, as indicated by the dashed box, the property information of each group may be filtered 530 based on privilege settings, e.g., to eliminate irrelevant and/or to hide private property information. For example, the dynamic algorithmic filtering processes of time range and/or user credential filtering may be applied to the sub-stacks.

The interface module 215 of the application 110 may next display 535 each collapsed value in an interface 216*a* via selectable fields. Upon selection 540 of any of the selectable fields, the interface module 215 may present the underlying property information for that collapse value in a sub-interface 216*b*. If the application 110 receives 545 an indication that the databases have been altered and/or updated with additional records, the application 110 may then return to aggregating 505 the records so that the most likely values for any property characteristic for any target property may be updated.

Next, the exemplary process flow 500 ends.

In view of the above, the application 110 may thus dynamically provide users with the most current real estate information from the widest span of data sources across the greatest aggregation of markets. The application 110 may in turn implement a range of activities and processes used to create, manage, and validate real estate data in a data curation process and, therefore, may aggregate imperfect and often discrepant real estate data from multiple sources to create estimates.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Further, for purposes of explanation, numerous details are set forth, such as flowcharts and system configurations, to provide an understanding of one or more embodiments. However, it is and will be apparent to one skilled in the art that these specific details are not required to practice the described.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A computer program product embodied on a non-transitory computer-readable data storage device wherein the computer program product processes a set of collapsed values for a subject property, the computer program product comprising:

computer code for aggregating property data from multiple databases into a data structure, the property data includes property information;

computer code for extracting the property information from the data structure after the property data from the multiple databases have been aggregated into the data structure, the property information includes records that pertain to the subject property;

computer code for sorting the records into sub-stacks after the property information has been extracted from the data structure, one of the sub-stacks comprises the records that pertain to a characteristic of the subject property;

computer code for generating a user interface that presents a list of property characteristics on a display device, the characteristic is one of the property characteristics; and computer code for positioning a selectable field on the display device adjacent the characteristic in a manner that a list of the records in the one of the sub-stacks becomes viewable on the display device when a user clicks the selectable field.

2. The computer program product of claim 1, further comprising:

computer code for designating the characteristic as discrepant property information when information that describes the characteristic differs between the records in the one of the sub-stacks.

3. The computer program product of claim 2, further comprising:

computer code for using a heuristic to electronically determine a value for the discrepant property information.

4. The computer program product of claim 1, wherein the property characteristics are information that describes attributes of the subject property.

5. The computer program product of claim 1, wherein further comprising:

computer code for generating a different user interface that lists data from one of the records, wherein the data becomes viewable on the display device response to a selection of the one of the records.

6. The computer program product of claim 5, wherein the data are the property characteristics from the one of the records.

7. The computer program product of claim 1, wherein the property data include information for a plurality of real properties, one of the real properties is the subject property.

8. An electronic device that is electrically connected to a distributed network in a manner that, upon execution of the computer program product of claim 1, the electronic device electronically retrieves the property data over the distributed network from the multiple databases before the electronic device electronically aggregates the property data into the data structure.

9. The electronic device claim 8, wherein the distributed network facilitates electronic communication between the electronic device and system devices.

10. The electronic device claim 8, wherein the electronic device electronically extracts the property information from the data structure after the electronic device electronically aggregates the property data into the data structure.

11. The electronic device claim 8, wherein the electronic device electronically sorts the records into the sub-stacks after the electronic device electronically extracts the property information from the data structure.

* * * * *